United States Patent [19]

Murphy et al.

[11] 3,996,418
[45] Dec. 7, 1976

[54] SCRAMBLER AND DECODER FOR SECURE TELEVISION SYSTEM

[75] Inventors: William D. Murphy, Burlington; Gerald Aaronson, Brookline, both of Mass.

[73] Assignee: GTE Laboratories Incorporated, Waltham, Mass.

[22] Filed: Sept. 2, 1975

[21] Appl. No.: 609,878

Related U.S. Application Data

[63] Continuation-in-part of Ser. No. 494,653, Aug. 5, 1974, Pat. No. 3,936,593.

[52] U.S. Cl. .............................. 178/5.1; 325/138; 325/144; 325/145
[51] Int. Cl.² ...................................... H04N 1/44
[58] Field of Search ................ 178/5.1; 179/1.5 R; 325/138, 144, 145

[56] References Cited

UNITED STATES PATENTS

| 2,709,218 | 5/1955 | Gabrilovitch | 179/1.5 R |
|---|---|---|---|
| 3,084,329 | 4/1963 | Clay | 325/65 |
| 3,180,927 | 4/1965 | Heppe et al. | 325/34 |
| 3,500,250 | 3/1970 | Frerking | 325/138 |
| 3,729,576 | 4/1973 | Court | 178/5.1 |
| 3,852,519 | 12/1974 | Court | 178/5.1 |

Primary Examiner—Maynard R. Wilbur
Assistant Examiner—S. C. Buczinski
Attorney, Agent, or Firm—Irving M. Kriegsman; Leslie J. Hart

[57] ABSTRACT

A scrambler for a television system alternately inverts the phase of the carrier which is modulated by the television signal. A binary coding signal controls the manner of the carrier-phase inversion. Phase inversion is obtained by combining the modulated normal carrier with an out of phase carrier having a maximum peak amplitude greater than the peak amplitude of the modulated carrier. The coding signal also frequency modulates the carrier for the scrambled television signal thereby providing a key for decoding at the television receiver. The decoder at the receiver reproduces the coding signal from the scrambled signal, removes the frequency modulation and combines the scrambled signal with a reproduced normal carrier at the time intervals corresponding to the presence of the phase-inverted carrier. An automatic gain control circuit insures that the decoded television signal has constant sync pulse amplitude for normal carrier intervals and inverted phase carrier intervals by controlling the reproduced normal carrier amplitude as a function of sync pulses in the normal carrier portion of the scrambled television signal.

26 Claims, 5 Drawing Figures

SCRAMBLER AND DECODER FOR SECURE TELEVISION SYSTEM

REFERENCE TO PARENT APPLICATION

This application is a continuation-in-part application of application Ser. No. 494,653, filed Aug. 5, 1974 U.S. Pat. No. 3,936,593.

BACKGROUND OF THE INVENTION

The present invention relates to an apparatus for and a method of scrambling and decoding a television signal in a secure television system.

The scrambling of television signals and the associated decoding thereof has been used and extensively described. The need for private transmission particularly arises in the cable television field where several of the many available television channels may carry programs which may only be viewed under special conditions, such as after making prepayments.

Many devices have been proposed whereby television signals are transmitted in a scrambled form and cannot be displayed by a conventional receiver unless a special decoding device is employed. Generally, the scrambling technique requires complex decoders at the subscribers and present a relatively high investment when a large number of subscribers are to be provided with decoders to unscramble the received television signal.

Secret signaling is old in the art. An early U.S. patent to Mathes U.S. Pat. No. 1,542,566 issued in 1925 and described a system wherein the frequency band occupied by the signal was subdivided by filters into discrete separate bands. The subdivided bands are shifted in phase relative to each other and then recombined for transmission. At the receiver, the individual sub-bands are phase shifted in the order necessary to reconstruct the original signal.

The U.S. patent to Nyguist et al., U.S. Pat. No. 1,726,578 teaches a secret signaling system wherein different frequencies in a signal are subjected to different degrees of delay. The original signal is restored by passing the received scrambled signal through a network which is complementary to that employed at the transmitter.

In the U.S. patent to Handsell U.S. Pat. No. 2,169,357 a secret signaling device is disclosed wherein a carrier is phase modulated and subsequently modulated with an audio signal to be kept private. The audio signal is recovered by re-introducing the carrier followed by filtering to remove higher frequency beats produced with the re-introduced carrier.

In the U.S. patent to Clothier U.S. Pat. No. 2,678,347 a system is described for rendering a television signal private except to the subscriber who is provided with a specific decoding mechanism. An error signal is introduced at the transmitter to phase modulate the video signal and this error signal is removed at the subscriber receiver. The U.S. patent to Bartelink U.S. Pat. No. 2,833,850 teaches another private subscriber television system wherein the video signal is scrambled to provide private transmission and reception. Many other television scrambling systems have been proposed such as described in the U.S. patents to Wendt et al., U.S. Pat. No. 2,875,270, Druz et al., U.S. Pat. No. 2,987,576, Kahn U.S. Pat. No. 3,333,052, Zopf et al., U.S. Pat. No. 3,717,206, Court U.S. Pat. No. 3,729,576 and Court U.S. Pat. No. 3,852,519.

In the first Court patent a system is described wherein a video modulated carrier is further modulated with a sine wave in sychronism with the horizontal line frequency. The sine wave's frequency and phase are selected to depress sync pulses and blanking information while enhancing other parts of the video signal. The decoding device at the receiver provides a decoding sine wave which is in antiphase with the encoding sine wave modulation.

In the second Court patent, an rf modulated television signal has its normal, unscrambled carrier replaced with an amplitude adjusted scrambling carrier of the same frequency but different phase. The resulting television signal is effectively scrambled and rendered private by virtue of the impairment of the displayability of the scrambled television signal on a conventional television set.

SUMMARY OF THE INVENTION

It is an object of the present invention to provide a scrambling and decoding system capable of high security.

It is a further object of the invention to provide a method and a scrambler and decoder apparatus for a television system wherein the scrambled signal may be used to convey information in the form of a coding signal.

It is still an additional object of the present invention to provided a scrambling and decoding apparatus which overcomes the need for critical amplitude and phase adjustment of various components at the decoder to properly decode the television signal.

According to the present invention, there is provided an apparatus for and a method of scrambling and decoding a television signal in a manner so as to accomplish these and other objects. In the scrambler, the phase of the carrier for the television signal is alternately changed so that during some intervals, the carrier phase and modulation is normal and during other intervals, the carrier phase is changed. The manner of phase change is regulated by a dual level coding signal which also frequency modulates the carrier to provide a means whereby the scrambled carrier may be decoded at the receiver. During phase changed intervals, the sync signals and video amplitude information have altered amplitude levels which effectively scrambles the television signal. By periodically phase changing the carrier, simple receiver modifications to decode the television signal will be ineffective for pirating. More importantly, the normal carrier signals control the amplitude of the decoded signals during the phase changed intervals. In this manner, control is effected directly over sync pulse amplitude rather than video information amplitude.

In the decoder, the frequency modulation is removed, and the coding signal is regenerated from the scrambled television signal. A normal carrier is regenerated and phase locked to the scrambled television signal. The regenerated carrier is combined with the scrambled television signal only at the time intervals where the television signal has the phase changed carrier. By adjusting the regenerated carrier amplitude, the television signal is decoded by removing the scrambling carrier. A gain control circuit responsive to the peak amplitude of the television signal during normal intervals is provided for controlling the amplitude of the decoded television signal during phase changed intervals.

BRIEF DESCRIPTION OF THE DRAWINGS

These and other objects and advantages of the invention can be understood from the following description of preferred embodiments described in conjunction with the drawings wherein.

DESCRIPTION OF PREFERRED EMBODIMENT

Figure 1:
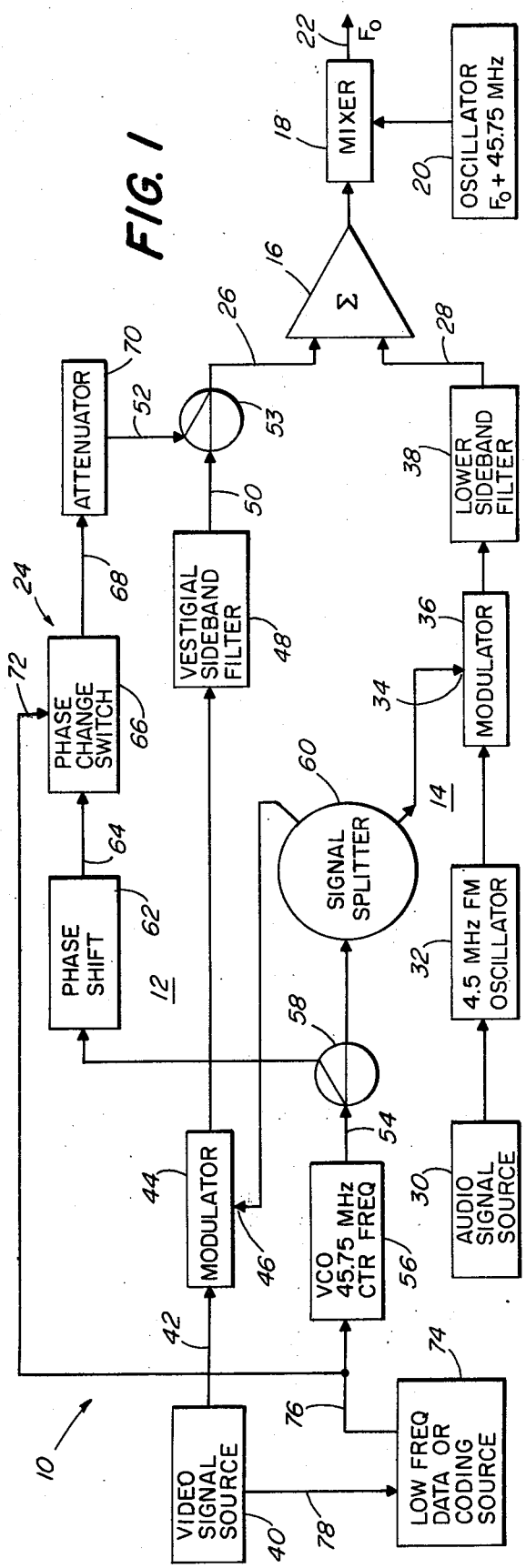
FIG. 1 is a block diagram of a television signal scrambler in accordance with the invention.

In an exemplary embodiment of the present invention, as illustrated in FIG. 1, there is provided a television signal scrambler 10 for use in a television system, such as a cable TV system. The scrambler 10 includes a visual channel 12 and an audio channel 14 which are combined at a summing network and amplifier 16. The output from network 16 is applied to a mixer 18 together with a carrier signal from an oscillator 20 having an output frequency selected to produce a television signal on mixer output 22 for a preselected channel frequency. A scrambling circuit 24 is provided, operative on the visual channel 12, to generate a scrambled picture carrier on output line 26.

The audio channel 14 is unscrambled and provides an audio modulated carrier on an output 28 for combination with the scrambled picture carrier on line 26 by the summing network 16. The audio channel 14 includes a conventional source 30 of audio signals, such as a microphone and preamplifier (not shown). The audio signal from the source 30 frequency modulates (FM) the output signal from a 4.5 mHz sound carrier oscillator 32 for appropriate placement of the sound signal in a standard television channel. The FM modulated sound signal in turn amplitude modulates an intermediate frequency (IF) carrier on input 34 of a modulator 36. The sound modulated IF carrier is passed through a filter 38 to remove the upper sideband and 45.75 mHz carrier and provide the desired IF sound carrier on line 28.

The visual channel 12 includes a conventional source 40 of video signals, such as from a tape recorder or video camera (not shown). The video signals on line 42 are applied to an IF carrier modulator 44 provided with the same IF carrier on input 46 as applied to input 34 of the IF carrier modulator 36 in the sound channel 14. The output from modulator 44 is passed through a filter 48 which provides a vestigial sideband signal on filter output 50 for combination in a coupler 53 with a scrambling IF carrier on line 52 from scrambling network 24.

The scrambler network 24 operates by altering the characteristics of the carrier employed in the transmission of the television signal. The carrier used originates at an output 54 of the voltage controlled oscillator 56 which normally operates at an intermediate frequency (IF) of 45.75 mHz. The carrier on line 54 is applied through a directional coupler 58 to a signal splitter 60 which provides the inputs 34 and 46 for the modulators 36 and 44, respectively, with the same IF carrier signal.

Another output of coupler 58 is applied to a phase shift network 62 which in the exemplary embodiment provides about 180° overall phase shift to the IF carrier appearing at the output of directional coupler 26. The phase shifted IF carrier on line 64 is applied to a phase change switch 66 whose output 68 is applied through an adjustable attenuator 70 to provide a scrambled IF carrier on the output 52. The switch 66 is a device that either blocks or passes the phase shifted carrier depending upon the logic level state of a signal at a control input 72. Any conventionally known PIN diode electronic switch may be used for the phase change switch 66 in FIG. 1.

A low frequency or coding source 74 produces a coding signal at an output 76. The coding signal source may be an oscillator, or a specially coded low frequency signal which can convey useful information to a subscriber location. Coding may be obtained with pulse modulation by, for example, turning a coding oscillator on for different time periods respectively interpreted as different information. The coding signal source 74 provides a coding signal having a pair of alternating signal levels. This signal at output 76 becomes the control input 72 for the phase change switch 66 and a control input for the voltage controlled oscillator 56. During the first signal level intervals, such as the logic "0"s, the switch 66 is closed and therefore passes the phase shifted carrier at the output 64 to the attenuator 70. During the second signal level intervals, such as the logic "1"s, the switch 66 is open and does not pass the phase shifted carrier to the atlernator 70.

Since the IF carrier phase change sequence is to be removed at the receiver, a pilot signal representative of the coding signal is transmitted. This pilot signal is generated by FM modulating the IF carrier a predetermined amount simultaneously with the phase changed sequence of the carrier. The coding signal output 76 is thus coupled to the IF variable oscillator 56 to provide the latter with a small amount of frequency deviation, i.e. about ± 15 kHz at the low coding signal rate of up to 500 Hz. The deviation and modulation frequency of the IF carrier is kept small to avoid measurable television picture signal interference which would be objectionable to a subscriber at the receiver end.

Preferably, the coding signal source 74 is keyed by the vertical sync pulses on an output 78 from the video signal source 40, as shown in the illustrative embodiment of FIG. 1. Thus, the carrier phase may be altered as often as every picture frame if desired. The advantage of keying the coding signal transitions to the vertical sync pulses is that the rapid phase transition is performed during vertical retrace time which allows the decoder sufficient time to correct the decoder phase before the beginning of the next frame. Structurally, the source 74 could merely be a counter which counts the vertical sync pulses, and the coding signal is merely the output of one or more of the stages of the counter.

Figure 2A:
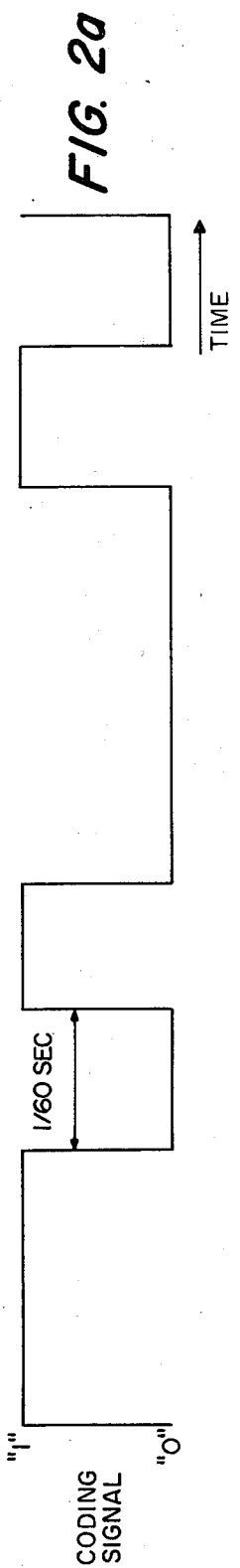
FIG. 2a is a waveform of the coding signal according to the invention.
Figure 2B:
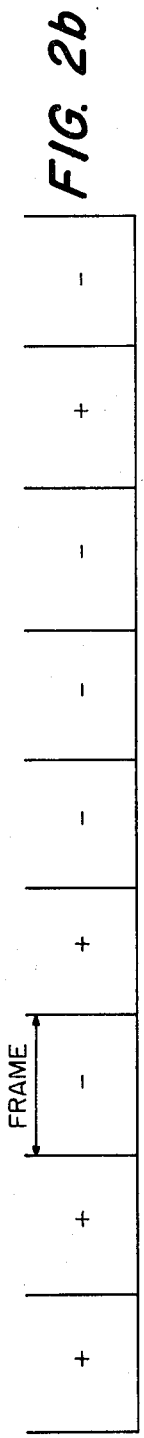
FIG. 2b is an illustration of how the coding signal of FIG. 2a may be used to convey useful digital information.

Preferably, more than 50% of the frames are transmitted with a phase changed carrier to insure that a sufficient level of scrambling is obtained. A typical coding signal format meeting this preferred feature is illustrated in FIGS. 2a and 2b. In FIG. 2a, first signal level intervals (i.e. phase change intervals) are the logic "0"s and the second signal level intervals (i.e. normal carrier intervals) are the logic "1"s. Thus, for the total time interval for nine picture frames, four frames are with normal carriers and five frames are with phase changed carriers. Since carrier switching is preferably performed during vertical retrace time, the maximum rate of phase change is 60 per second.

The program code (i.e. the useful digital information forming the coding signal) can serve a variety of functions in a pay TV system. For a simple subscription system, the transmitted code must match a "wired-in" or "code-of-the-month" that is resident in the converter in order to operate the decode function. Alternatively, the code might represent a multiplicity of subscription packages that can be purchased, i.e., sports events, drama, and allows operation of the proper converter.

Preferably, the phase change of the carrier is substantially 180° (i.e. a phase inversion) since this provides more effective scrambling without additional circuitry. The amplitude of the scrambling carrier on line 52 is adjusted by the attenuator 70 to be sufficient to completely replace the normal carrier in the vestigial sideband signal on line 50. Preferably, the inverted carrier amplitude is 110% of the peak amplitude of normal carrier signal on line 50. Since the peak amplitude of the normal signal is the sync pulse, the sync pulse for the phase inverted frame is at 10% of peak amplitude. As a result, the white level of one field has the same level as sync in an alternate field.

Figure 3:
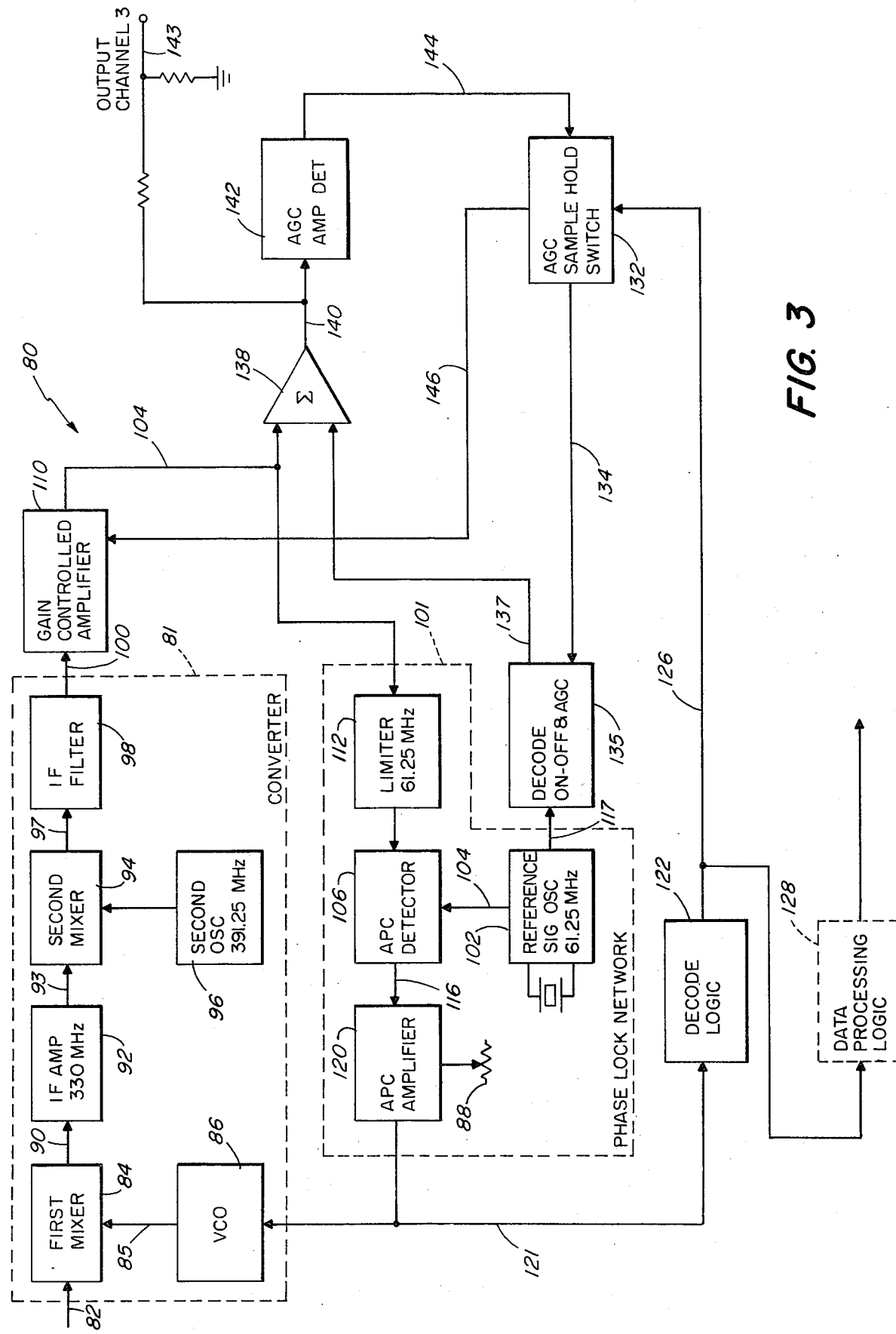
FIG. 3 is a block diagram of a decoder for scrambled television signal in accordance with the invention.

Referring now to FIG. 3, a decoder 80 is illustrated in block diagram form whereby the received television signal on a cable television input line 82 corresponds to the television signal generated in a scrambled form on the output line 22 in the scrambler 10 illustrated in FIG. 1. The decoder 80 includes a converter circuit 81 for converting the carrier of the scrambled television signal to a desired intermediate frequency (IF). The television signal is applied to a first mixer 84 which is supplied by a local oscillator via an input 85 frequency from a voltage controlled oscillator (VCO) 86 tunable over a wide range with a channel selector 88 in the form of a potentiometer. The frequency of the VCO 86 is selected so that an output 90 of the first mixer 84 is an IF signal of 330 mHz which, in turn, is passed through an IF amplifier 92.

An output 93 of the IF amplifier 92 is applied to a second mixer 94 which, in turn, is supplied with a local oscillator signal from a source 96 having a frequency selected to provide a predetermined normally unused television channel signal at an output 97. In many localities such unused channel is channel 3, as shown in FIG. 3, so that the frequency of the oscillator 96 is 391.25 mHz to provide a television signal carrier at a frequency of 61.25 mHz (channel 3) on the output 97 of the second mixer 94. An IF filter 98 removes other frequencies and provides only the Channel 3 signal on a converter output 100.

The decoder 80 includes the capability for regenerating the coding signal and for removing the frequency modulation from the scrambled television signal. These features are accomplished in the exemplary embodiment by a phase lock network, represented generally by the numeral 101, which is used to control the input to the voltage control oscillator 86 of the converter. The phase lock network 101 includes a reference signal oscillator 102 which provides a signal on an output line 104 to an automatic phase control (APC) detector 106. The frequency of this signal is the same as the normal IF frequency output of the converter, which in the example is 61.25 mHz. The (APC) detector 106 compares the phase of the oscillator IF signal with the phase of the IF converted, scrambled television signal present on an input line 104 for the phase lock network. The IF converted, scrambled television signal at the output 100 of the converter 81 is amplified by a gain control amplifier 110 and then amplitude limited by a limiter 112. The function of the detector 106 is to generate an output 116 which is a function of the instantaneous phase difference between the reference IF signal oscillator output 104 and the IF converted, scrambled television signal. The detector output 116 is in turn applied to an automatic phase control amplifier 120 which suitably amplifies the signal so that it may control the frequency of the voltage controlled oscillator 126 in the converter 81. The output signal 121 of the APC amplifier 120 is directly related to the coding signal since the output is a function of the frequency modulation of the carrier of the television signal. Thus, in operation, the VCO 86 has its frequency varied such that the output 100 from the converter is a constant 61.25 mHz. In this manner, the frequency modulation is removed and the coding signal is regenerated at output 121 of the phase lock network 101.

The decoder 80 also includes apparatus responsive to the regenerated coding signal for replacing the scrambling carrier with a regenerated normal carrier during the time intervals in which the carrier phase was altered (i.e. inverted in the preferred embodiment). This is accomplished by directing the regenerated coding signal at the amplifier output 121 to a decode logic 122. The purpose of the decode logic 122 is to reshape the waveform of the output 121 so as to be compatible with the circuitry being driven by the decode logic. For example, in the exemplary embodiment, the output 121 is a low level (2mV P-P) signal, and the decode logic includes multistage high-gain operaional amplifier circuitry for generating an output signal of about 5 volts on an output line 126. The regenerated coding signal on output 126 is sent to a data processing logic 128 which in turn utilizes the information contained or coded onto the regenerated coding signal.

In an important aspect of the present invention, the decoder 80 includes means for automatically controlling the gain of the unscrambled television signal. The purpose of this automatic gain control system is to maintain a fixed sync signal level at the decoding summing point since proper decoding depends on the decoding carrier being 180° out of phase and 110% of the signal amplitude. Slight errors between the two levels result in a noticeable 30 Hz flicker on the decoded signal. As shown in FIG. 3, a decode on-off AGC circuit 135 provides an output on line 137 which is combined at a hybrid combiner 138 with the output on line 104 from the gain controlled amplifier 110. The output 140 of the hybrid combiner 138 is directed at 143 to the TV receiver (not shown). The combiner output 140 is also directed to an AGC amplifier-detector circuit 142 having an output 144 ranging between 1 to 2 volts depending upon the peak input signal level. This circuit provides an output which is directly related to the peak voltage (sync amplitude) during the normal, non-inverted fields. The output 144 of the detector is then applied to an AGC sample-hold switch 132 which applies this voltage on an output 146 to the gain control amplifier 110 during normal carrier intervals in response to the logic level signal on line 126. The logic level on the line 126 which is representative of inverted frames directs the AGC detector output 144 through the sample and hold switch 132 onto line 134 to the decode on-off and AGC 135. This signal from detector 142 in turn determines the level of the reference oscillator signal on line 117 that is applied via line 137 to the combiner 138.

Figure 4:
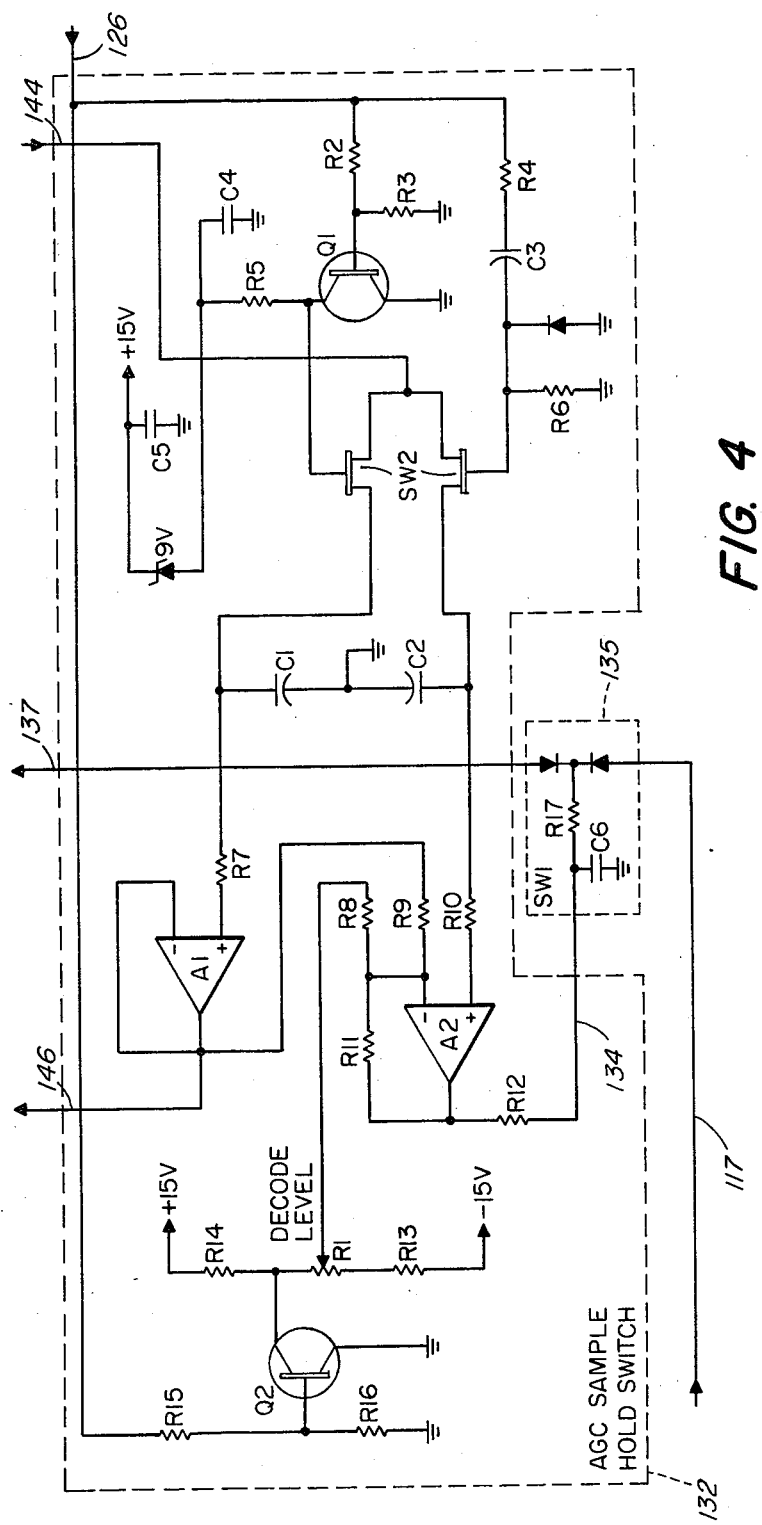
FIG. 4 is a schematic diagram of the sample and hold switch and the decode on-off and AGC circuit shown in block diagram form in FIG. 3.

The following, together with FIG. 4, describes the operation of a preferred embodiment of the AGC sample-hold switch 132 and the decode on-off and AGC circuit 135 shown in the block diagram of FIG. 3. A switch SW2 such as a Siliconix type DG181 SPDT CMOS switch, is used to charge either of pair of capacitors, C1 and C2, to the peak AGC voltage, depending on the logic level derived from the regenerated coding signal on the output 126 of the decode logic 122. When a "normal" field is being received, the upper switch section is closed and the capacitor C1 charges to the AGC voltage which is present on the output 144 from the detector. The time constant of the capacitor C1 and the load resistance of the AGC detector (120 KΩ) (not shown) is long enough to completely remove any video components from the output. The AGC voltage is buffered by an operational amplifier unity gain follower A1 which has extremely high input impedance. The output of the amplifier A1 is applied via the output 146 to the gain control amplifier 110 (not shown in FIG. 4) and to the inverting input of a high gain differential amplifier A2.

During reception of fields having an inverted carrier, the peak signal level is dependent on modulation level, and cannot be used for developing an AGC voltage. However, at the beginning of each inverted field, the regenerated coding signal generates a logic voltage to reverse the switch SW2. Thus, the capacitor C1 is disconnected from the AGC detector 142 and its voltage is retained because of the high input impedance of the follower A1. Amplifier A1 continues to apply the "stored" AGC voltage to gain control amplifier 110 and to the differential amplifier A2. The logic closes the lower switch section, connecting the capacitor C2 and the noninverting input of amplifier A2 to the AGC detector. The logic also turns off a transistor Q2, and allows a decode level control, resistor R1, to adjust the amplifier A2 output voltage to some slight negative value. (During "normal" field reception, the transistor Q2 is "on" and a negative input voltage is applied to the amplifier A2, driving it to positive saturation of nearly +15 V output. This positive voltage reverse biases the PIN diodes in the decode switch SW1, disconnecting the decode carrier from the combiner 138.

However, the negative output from the amplifier A2, as set by the resistor R1, slightly forward biases the PIN diodes which are now a current controlled attenuator, and passes the decode carrier from the line 117 to the combiner 138 via the line 137. The detector 142 now sees a decoded signal with sync at maximum level, and the AGC detector charges C2 to the peak signal level. The amplifier A2 wll continue to increase the PIN diode forward current and the decode carrier level until the voltage on the capacitor C2 equals the stored voltage across the capacitor Cl. Thus, the decoded signal is automatically adjusted to equal normal signal levels. Should the signal strength vary, the capacitor C1 voltage will change during normal fields, and the differential amplifier A2 will adjust the decode carrier level so C2 voltage again equals the new AGC voltage.

The following table identifies the various components used in the circuit of FIG. 4.

| R1 | 5 kΩ | R8 | 56 kΩ | R15 | 39 kΩ | C5 | .01 µf |
| --- | --- | --- | --- | --- | --- | --- | --- |
| R2 | 39 kΩ | R9 | 10 kΩ | R16 | 47 kΩ | C6 | 100 µf |
| R3 | 47 kΩ | R10 | 8.2 kΩ | R17 | 1 kΩ | Q1 | 2N3904 |
| R4 | 10 kΩ | R11 | 330 kΩ | C1 | 10 µf | Q2 | 2N3904 |
| R5 | 10 kΩ | R12 | 100 Ω | C2 | 10 µf | A1 | ½1747 |
| R6 | 100 kΩ | R13 | 5.6 kΩ | C3 | 100 µf | A2 | ½1747 |
| R7 | 8.2 kΩ | R14 | 5.6 kΩ | C4 | .01 µf | | |

The embodiments of the present invention are intended to be merely exemplary and those skilled in the art shall be able to make numerous and various modifications of them without departing from the spirit of the present invention. All such modifications and variations are intended to be within the scope of the present invention as defined by the appended claims.

We claim:
1. A scrambling and decoding apparatus for a television system comprising:
   a. means for generating a coding signal having a pair of alternating signal levels,
   b. means for frequency modulating a normal carrier with the coding signal,
   c. means for amplitude modulating the frequency modulated normal carrier with a television signal,
   d. means for replacing the normal carrier in the television signal modulated normal carrier with a scrambling carrier during the first signal level intervals of the coding signal, the scrambling carrier having the same frequency as the normal carrier and having a different predetermined phase relationship to the normal carrier to produce a scrambled television signal,
   e. means at a receiving end of the television system for regenerating the coding signal and for removing the frequency modulation from the scrambled television signal, and
   f. means responsive to the regenerated coding signal for replacing the scrambling carrier of the scrambled television signal with a regenerated normal carrier during the first signal level intervals of the regenerated coding signal to decode the scrambled television signal.

2. The apparatus according to claim 1 wherein the coding signal generating means is keyed to the vertical sync pulses of the television signal so that the transitions between the alternating signal levels are synchronized to the picture frames of the television signal.

3. The aparatus according to claim 2 wherein the first signal level intervals comprise at least 50% of the total of the first and second signal level intervals so that at least half of the picture frames are scrambled.

4. The apparatus according to claim 1 wherein the coding signal is adapted to convey useful information in digital form.

5. The apparatus according to claim 1 wherein the means for replacing the normal carrier includes:
   a. means for phase shifting the frequency modulated normal carrier to generate a scrambling carrier which is of the same frequency as the normal carrier but with a predetermined scrambling phase difference therebetween,
   b. switching means responsive to the coding signal for gating the scrambling carrier during the first signal level intervals, and
   c. means for combining the gated, scrambling carrier with the television signal modulated normal carrier to produce the scrambled television signal.

6. The apparatus according to claim 5 wherein the phase of the scrambling carrier is inverted with respect to the phase of the normal carrier and further including amplitude adjusting means for making the amplitude of the gated scrambling carrier greater than the peak amplitude of the television signal modulated normal carrier.

7. The apparatus according to claim 5 wherein the amplitude of the scrambling carrier is approximately 110% of the peak amplitude of the television signal modulated normal carrier.

8. The apparatus according to claim 6 wherein the frequency modulation removing means includes:
  a. means including a receiver intermediate frequency (IF) oscillator operating at a receiver intermediate frequency for phase locking the received television signal to the receiver oscillator, the signal from the oscillator forming a decoding carrier.

9. The apparatus according to claim 8 wherein the phase locking means further includes:
  a. means including a receiver variable frequency local oscillator for converting the received scrambled televison signal to the receiver IF, and
  b. a phase detector responsive to the receiver IF oscillator and the output from the converting means to produce a phase detector output signal representative of the difference in phase therebetween, the detector output signal being applied to the variable frequency local oscillator and having a magnitude and polarity selected to establish phase lock between the frequency converted television signal and the receiver IF oscillator thereby removing the frequency modulation from the television signal, the detector output signal also being representative of the coding signal.

10. The apparatus according to claim 9 wherein the means for replacing the scrambled carrier includes:
  a. means responsive to the regenerated coding signal for gating the intermediate frequency from the receiver oscillator only during first signal level intervals of the regenerated coding signal, and
  b. means for combining the outputs of the converter means and the gating means to decode the scrambled television signal.

11. The apparatus according to claim 10 further including means responsive to the peak amplitude of the scrambled television during the second signal level intervals for automatically controlling the amplitude of the decoding carrier during the first signal level intervals to produce a decoded television signal having sync pulses of constant level during both first and second signal level intervals.

12. An apparatus for scrambling a television signal modulated on a normal carrier comprising:
  a. means for producing a scrambling carrier of the same frequency as the normal carrier and with a preselected phase difference therebetween,
  b. meas for generating a coding signal having a pair of alternating signal levels whose transitions are synchronized to the vertical sync pulses of the television signal,
  c. means for frequency modulating the normal and scrambling carriers with the coding signal, and
  d. means for combining the television signal modulated normal carrier with the scrambling carrier during one signal level interval of the coding signal to create a scrambled television signal in which the carrier has alternative phase changes.

13. The apparatus according to claim 12 wherein the preselected phase difference is substantially equal to 180°.

14. The apparatus according to claim 13 wherein the amplitude of the scrambling carrier is greater than the peak amplitude of the modulated normal carrier to produce a scrambled television signal having a carrier with alternating inverted phase and amplitude displaced video and synchronization information.

15. An apparatus for decoding a scrambled television signal of the type in which a coding signal with alternating dual levels frequency modulates a carrier which has a normal carrier during one signal level interval and a phase inverted scrambling carrier during the other signal level interval, comprising:
  a. means for producing an oscillator signal representative of a desired intermediate frequency (IF) of the carrier of the scrambled television signal,
  b. means responsive to the scrambled televison signal for phase locking an IF converted representation of the scrambled television signal to the oscillator signal to remove the frequency modulation and to regenerate the coding signal,
  c. decoding means responsive to the regenerated coding signal for generating an IF representation of the normal carrier only during the reception of the inverted carrier television signal, and
  d. means for combining the IF converted representation of the received scrambled television signal with the gated IF representation of the normal carrier to remove the scrambling carrier and thereby decode the television signal.

16. The apparatus according to claim 15 further including automatic gain control means responsive to the amplitude of the television sync pulses during the normal carrier intervals for controlling the amplitude of the IF representation of the normal carrier during inverted carrier intervals so that the sync pulses of the decoded television signal have the same amplitude as the sync pulses during the normal carrier interval.

17. The apparatus according to claim 16 wherein the gain control means includes:
  a. a gain controlled amplifier receiving the scrambled television signal and having a gain that is related to a gain control signal,
  b. detector means responsive to the output of the combining means for generating a detector signal representative of the peak amplitude of the television signal during the normal carrier interval,
  c. means responsive to the regenerated coding signal for gating the detector signal to the gain controlled amplifier so as to form the gain control signal,
  d. sampling means responsive to the regenerated coding signal for holding the detector signal during the inverted carrier interval and gating the held detector signal to the gain controlled amplifier and also generating a decode signal related to the detector signal, and
  e. wherein the decoding means further includes means for adjusting the amplitude of the IF representation of the normal carrier such that the detector signal during inverted carrier intervals is equal to the detector signal during normal carrier intervals.

18. A method of scrambling a television signal which is decoded at the receiving end to which the television signal is sent in a scrambled form comprising the steps of:

a. producing a coding signal having a pair of alternating signal levels,
b. frequency modulating a normal carrier with the coding signal,
c. amplitude modulating the frequency modulated normal carrier with a television signal,
d. phase shifting the frequency modulated normal carrier to generate a scrambling carrier which is of the same frequency as the normal carrier but with a predetermined scrambling phase difference therebetween, and
e. replacing the normal carrier in the television signal modulated normal carrier with the scrambling carrier during the first signal level interval of the coding signal to produce a scrambled television signal in which the carrier phase is alternately changed in a manner related to the coding signal.

19. The method according to claim 18 wherein the step of phase shifting includes the step of substantially inverting the phase of the normal carrier.

20. The method according to claim 19 wherein the step of replacing the normal carrier includes the steps of:
a. directing the phase inverted scrambling carrier through a switching device controlled by the coding signal such that the carrier passes through the switch during the first signal level intervals of the coding signal,
b. making the amplitude of the scrambling carrier greater than the peak amplitude of the television signal modulated normal carrier, and
c. combining the gated scrambling carrier with the television signal modulated normal carrier to produce phase inversion and distortion of the video and synchronization information.

21. The method according to claim 18 wherein the step of producing a coding signal includes the step of:
a. keying the transitions of the first and second dual alternating levels of the coding signal to the vertical sync pulses of the television signal so that the carriers for alternate picture frames of the television signal have differing phase.

22. The method according to claim 20 wherein the step of making the scrambling carrier amplitude greater includes the step of making the amplitude of the scrambling carrier approximately 110% of the sync pulses of the television signal so that the sync pulse amplitude during the carrier inversion interval is about 10% of the normal sync pulse amplitude.

23. The method according to claim 18 wherein the step of producing a coding signal is characterized by the generation of a coding signal formed to convey digital information.

24. The method according to claim 21 wherein the step of keying includes the step of:
a. forming the coding signal so as to have first signal level intervals occur at least 50% of the frames of the television signal to enhance scrambling.

25. The method for scrambling a television signal as claimed in claim 18 further including a method of decoding the scrambled television signal at the receiving end comprising the steps of:
a. removing the frequency modulation from the scrambled television signal,
b. regenerating the coding signal from the scrambled television signal,
c. regenerating a normal carrier with an oscillator phase locked to the scrambled television signal, and
d. replacing the scrambled carrier in the received television signal with the regenerated normal carrier during the first signal level intervals of the regenerated coding signal to decode the scrambled television signal.

26. The method according to claim 25 further including the step of automatically adjusting the amplitude of the decoded television signal during the first signal level intervals as a function of the amplitude of the television signal during the second signal level intervals of the regenerated coding signal so that the sync pulses of the decoded television signal have constant amplitude irrespective of the amplitude of the video information.

* * * * *